June 30, 1964

D. MARCUSE 3,139,589

MASER GAS BEAM FOCUSER WITH IMPROVED EFFICIENCY

Filed June 15, 1961

INVENTOR
D. MARCUSE
BY
ATTORNEY

June 30, 1964　　　　　D. MARCUSE　　　　　3,139,589
MASER GAS BEAM FOCUSER WITH IMPROVED EFFICIENCY
Filed June 15, 1961　　　　　　　　　　　　3 Sheets-Sheet 2

INVENTOR
D. MARCUSE
BY
ATTORNEY

June 30, 1964  D. MARCUSE  3,139,589
MASER GAS BEAM FOCUSER WITH IMPROVED EFFICIENCY
Filed June 15, 1961  3 Sheets-Sheet 3

INVENTOR
D. MARCUSE
BY
ATTORNEY

United States Patent Office 3,139,589
Patented June 30, 1964

3,139,589
MASER GAS BEAM FOCUSER WITH IMPROVED EFFICIENCY
Dietrich Marcuse, Fair Haven, N.J., assignor to Bell Telephone Laboratories, Incorporated, New York, N.Y., a corporation of New York
Filed June 15, 1961, Ser. No. 117,211
13 Claims. (Cl. 330—4)

This invention relates to gas beam masers and, in particular, to focusers for gas beam masers.

A gas beam maser, as its name implies, operates upon the same principles as the solid state maser and, accordingly, requires some method of altering the thermal equilibrium of the gas so as to achieve an excess of population in an upper energy state. Whereas this inversion in the energy state is accomplished in the solid state maser by "pumping" spin systems in the solid state material from a lower energy state to a higher one, in the gas maser an excess of high energy molecules is obtained by physically removing the lower energy molecules. This is done by passing the gas beam through an inhomogeneous electrostatic field which, typically, is produced by an array of conductive rods arranged in a circle and alternately charged to positive and negative potentials. (See, for example, "Beam Maser for 3 Millimeters Uses Hydrogen Cyanide," by F. S. Barnes and D. Maley, Electronics, March 17, 1961, pp. 45–49.)

Ideally, all of the higher energy molecules are retained within the gas beam while all of the molecules in the lower energy state are defocused and thereby removed from the beam. For some gases, however, and particularly those having linear, polar molecules, the molecules in any given energy state tend to separate under the influence of the inhomogeneous electric field. Depending upon the particular energy states involved, this partial focusing and defocusing has the effect of either losing some of the higher energy molecules or retaining some of the lower energy molecules which, preferably, should be removed from the gas beam. For purposes of explanation, a gas maser using hydrogen cyanide gas operating between the two lowest energy states is considered.

The gas beam, containing molecules in the $J=0$, $M=0$ and $J=1$, $M=0$, $\pm 1$ energy states, enters the focuser in the region of its longitudinal axis and travels therealong initially in a direction essentially parallel to the charged rods. However, under the influence of an inhomogeneous electrostatic field, molecules in the energy states $J=0$, $M=0$ and $J=1$, $M=\pm 1$ are deflected toward regions of increasing field strength, that is, toward the rods, while the molecules in the $J=1$, $M=0$ energy state are deflected toward the region of decreasing field along the axis of the focuser.

As a result of this, the gas beam entering the signal cavity and available to amplify the signal consists primarily of molecules in the $J=1$, $M=0$ energy state. Of the total number of molecules in the preferred $J=1$ state (including those in the $J=1$, $M=\pm 1$ states and in the $J=1$, $M=0$ state), only about one-third (those in the $J=1$, $M=0$ state) reach the signal cavity. The remaining two-thirds in the wanted $J=1$ energy state (i.e., the $J=1$, $M=\pm 1$ states) are lost.

It is, therefore, an object of this invention to increase the efficiency of the electrostatic gas beam focuser.

It is a more specific object of this invention to retain within the gas beam a greater proportion of the molecules in the upper energy state.

It is noted from the discussion given above that of the molecules in the preferred $J=1$ state, those that are lost, the so-called $M=\pm 1$ molecules, are in a lower energy state when under the influence of the inhomogeneous electrostatic field than those that are retained within the gas beam, i.e., the $J=1$, $M=0$ molecules.

It is, therefore, a further object of this invention to raise the energy level of the $J=1$, $M=\pm 1$ molecules to that of the $J=1$, $M=0$ molecules.

In accordance with the invention, increased focuser efficiency is obtained by superimposing upon the inhomogeneous electrostatic field a transverse radio frequency electric field for raising the $J=1$, $M=\pm 1$ molecules to the higher $J=1$, $M=0$ state. It can be shown that there exists a certain probability that the molecules which are subjected to a station electric field can change their quantum number M if they are simultaneously exposed to a suitable radio frequency electric field. The transition probability is high in a narrow region of space where the electrostatic field strength and the frequency of the radio frequency field satisfy a particular relationship. The two fields are oriented so that they have orthogonally directed components and the frequency of the radio frequency field adjusted to cause the $J=1$, $M=\pm 1$ molecules to experience a transition and jump to the $J=1$, $M=0$ state. After the transition, the molecules find themselves in a strong field traveling in the direction of increasing field strength. Since the natural tendency of the $J=1$, $M=0$ molecules is to travel in the direction of decreasing field strength, the molecules slow down and finally reverse their direction of travel. They start to move back towards the center of the focuser and are not lost as they would have been had the transition not occurred.

In a first embodiment of the invention, the focuser comprises a plurality of parallel rods symmetrically distributed about a common axis. The rods are preferably of low conductivity material along each of which there are disposed a number of conductive contacts. The conductivity of the rods is sufficient to allow a uniform static charge to spread over the length of each rod thereby uniformly charging each rod to an electrostatic potential over its entire length. Adjacent rods are charged plus and minus with respect to each other. At the same time a radio frequency source is connected between adjacent contacts on each rod. The resulting radio frequency field is parallel to the rods and due to the low rod conductivity is not short circuited at the rods.

So arranged, the electrostatic and the radio frequency focusing fields have components at right angles and interact with the gas molecules in the desired manner.

Alternatively, the focuser can be immersed in a resonant cavity tuned to the frequency of the radio frequency field.

To increase the volume of gas passing through the signal cavity, a plurality of gas sources distributed along the circumference of a circle are used. The gas beams are radialy directed and caused to pass through the signal cavity located at the center of the circle. For this type of gas maser the focuser comprises a pair of focusing planes each of which comprises a plurality of alternately charged radially oriented conductive rods. The radio frequency biasing field is applied between the focusing planes.

In a second embodiment of the radially directed gas geam maser each of the focusing planes comprises a plurality of alternately charged conductive circular rings.

While the principles of the invention have been applied to a gas beam maser using hydrogen cyanide gas operating between the two lowest energy states, it is understood that the techniques described herein are applicable whenever an inhomogeneous electrostatic field is used to separate molecule of different energy levels.

These and other objects and advantages, the nature of the present invention, and its various features, will appear more fully upon consideration of the various illustrative embodiments now to be described in detail in connection with the accompanying drawings in which.

Figure 1:
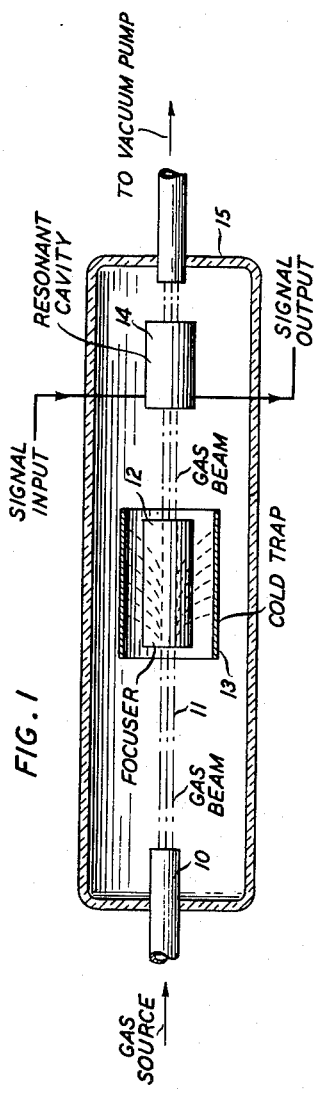
FIG. 1 shows, schematically, a gas beam maser.

Referring to FIG. 1, there is shown in schematic form the major components of a typical gas beam maser. Typically, the master comprises a gas source 10 and suitable controls (not shown) for controlling the gas flow, a focuser 12, a cold trap 13 for capturing gas particles that separate from the main gas beam 11 and a resonant signal cavity 14.

In operation, gas beam 11, containing molecules in all permissible energy states, enters the focuser 12 which defocuses the gas beam with respect to the molecules in the lower of two particular energy levels while focusing the gas beam with respect to the molecules in the higher of two energy levels. As a consequence, the gas beam upon leaving the focuser and entering the signal cavity has a molecular population which is abnormal in the sense that the upper energy level has a population greater than the lower energy level. The molecules in the upper energy level are characterized as "excited molecules." Because such excited molecules are capable of emitting electromagnetic wave energy at a particular frequency as they relax to the lower energy level, said molecules are further characterized as "resonant" at that frequency. The signal cavity, accordingly, is tuned to the resonant frequency of the molecules. If used as an amplifier, signal energy is applied to the signal cavity 14 from a signal source (not shown). An amplified signal of wave energy is extracted from cavity 14. When used as an oscillator, on the other hand, there is no need to apply signal energy from any external signal source, the oscillations being amplified and maintained by radiation emitted by the gas molecules in the cavity 14. The entire device is contained within an evacuated enclosure 15 and maintained at a pressure equivalent to $10^{-5}$ millimeters of mercury or less.

Figure 2:
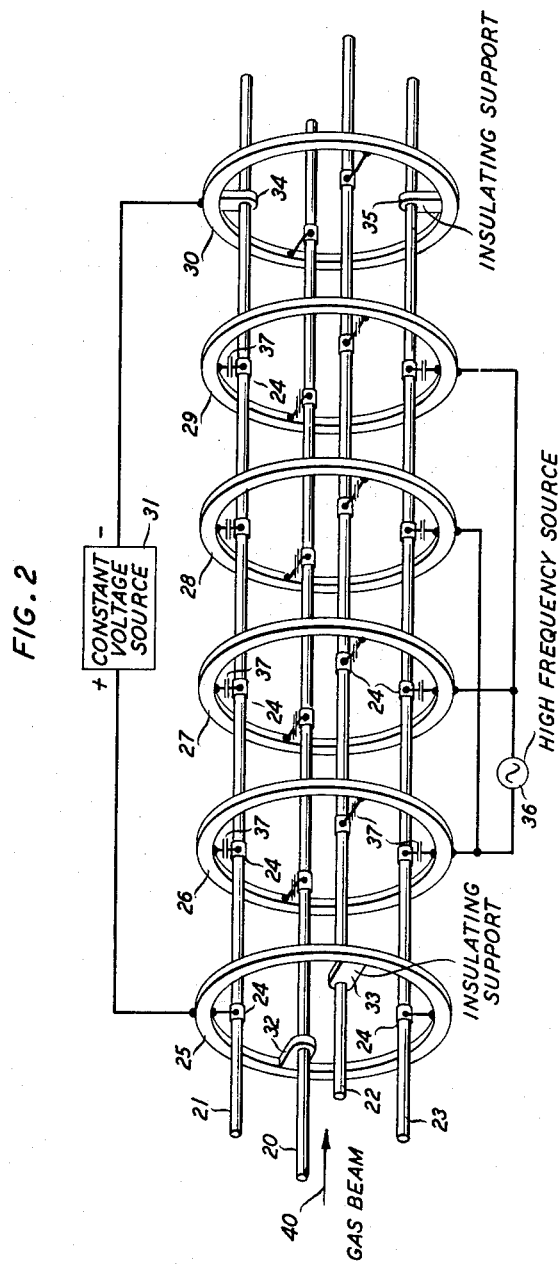
FIG. 2 shows a first embodiment of a focuser in accordance with the invention employing a combination of electrostatic focusing and radio frequency focusing.

FIG. 2 shows one embodiment of an improved gas beam focuser in accordance with the present invention. As shown, the focuser comprises four similar rods 20, 21, 22 and 23 that extend parallel to each other longitudinally and are equally spaced around the circumference of a circle. Although only four rods are shown in the embodiment of FIG. 2, the focuser can comprise a greater number of rods. Preferably an even number of rods such as, 6, 8 or 10 are used. Rods 20 through 23 are advantageously made of a poor conducting material such as a graphite-covered glass, although any other material having a low conductivity can be used.

Advantageously, at uniformly spaced intervals along each rod there are located a plurality of conductive contacts for making electrical connections to the focuser rods. These contacts are shown for the purposes of illustration as rings 24 on rod 21. However, any other suitable means for making such connections can be used. For example, conductive pins can be embedded in the rods.

Suitable means are also provided for physically supporting and electrically energizing the focuser rod. Typically, this can be accomplished by means of a number of supporting members 25 through 30 longitudinally distributed along the focuser at the positions of the conductive contacts. In the particular embodiment of FIG. 2, the end supporting members 25 and 30 are used to connect the focuser rods to a constant voltage source 31. Specifically, supporting member 25 is conductively connected to the contacts on alternate rods 21 and 23 and to the positive terminal of source 31 thereby charging rods 21 and 23 to a positive potential. Insulators 32 and 33, made of any suitable low-loss dielectric material such as, for example, Teflon, are used to connect the remaining rods 20 and 22 to supporting member 25 solely for the physical support afforded thereby.

At the other end of the focuser, member 30 is conductively connected to the contacts on rods 20 and 22 and the negative terminal of source 31 thereby charging rods 20 and 22 to a negative potential. Insulators 34 and 35 are similarly used to connect the positively charged rods 21 and 23 to member 30 for the purpose of support.

Similarly, where a larger number of rods are used in the focuser, the supporting member and the focuser rods are connected so that adjacent rods are oppositely charged. While the constant voltage is applied in the embodiment of FIG. 2 through the two end support members, it is understood that this arrangement is given only for purposes of illustration and could be modified so that any pair of support members can be used to apply the constant voltage field to the focuser rods.

The remaining support members 26, 27, 28 and 29 are used to connect the radio frequency field to the focuser structure. Each of these support members is connected to a conductive contact on each of the rods by means of a blocking capacitor 37. This permits the high frequency energy to reach the rods but prevents the constant voltage on the several rods from being short circuited.

In the embodiment of FIG. 2, support members 26 and 28 are connected to one terminal of a high frequency source 36 whereas support members 27 and 29 are connected to the other terminal of the high frequency source 36. When energized, adjacent support members are 180 degrees out of time phase producing a high frequency electric field which is essentially longitudinally directed along the focuser and at right angles to the constant voltage field.

The operation of a gas maser amplifier or oscillator is based upon the emission of electromagnetic wave energy by the gas molecules as they drop from a higher energy state to a lower energy state. In particular, it is the transition between rotational energy levels of the gas molecules that is utilized in the gas beam maser.

The rotational energy levels that the gas molecule can assume are given by $$V_J = BhJ(J+1) \tag{1}$$

where $J$ is the rotational quantum number and assumes all positive integers $J = 0, 1, 2, \ldots$, $B$ is a constant, characteristic of the gas, which for hydrogen cyanide is equal to 44315.97 megacycles per second and $h$ is Planck's constant equal to $6.624 \cdot 10^{-27}$ erg seconds.

The change from one rotational state to another is accompanied by either the absorption or the emission of a quantum of electromagnetic radiation of frequency $$f = \left| \frac{V_{J+1} - V_J}{h} \right| = 2B(J+1) \tag{2}$$

Absorption of photons of energy by the gas molecules occurs when electromagnetic radiation of the power frequency interacts with a molecule and raises the energy level of the molecule to the next higher state. Photon emission by the gas molecules occur when electromagnetic radiation of the proper frequency interacts with a molecule and lowers the energy level of the molecule to the next lower energy state. Because the induced emission of energy by many molecules is coherent, it enhances the radiation which is responsible for the induced emission. This effect makes it possible to use gas molecules to amplify or generate electromagnetic wave energy.

As an example, a hydrogen cyanide gas maser utilizing the transition between the two lowest energy states $J=1$ to $J=0$ can be made to amplify or generate wave energy at 88.6 kilomegacycles per second. Utilizing the $J=2$ to $J=1$ transition, the hydrogen cyanide maser will operate at 177 kilomegacycles per second. For purposes of illustration in the ensuing discussion, a hydrogen cyanide gas maser utilizing the $J=1$ to $J=0$ transition shall be described in some detail. It is understood, however, that the principles of the invention can be equally readily applied to gas beam masers using other gases and other transitions.

In a typical arrangement, a gas beam, consisting of molecules in all permissible rotational energy states, is made to traverse a resonant cavity tuned to frequency $f$, as given by Equation 2. As a microwave signal at frequency $f$ is admitted to the cavity, induced emission occurs and amplification of the incident signal is obtained provided the power emitted by the molecules in dropping from the $J=1$ to the $J=0$ state is greater than the sum of the power which is absorbed by the molecules in going from the $J=0$ to the $J=1$ state and the cavity losses.

The cavity losses can be minimized using techniques well known in the art. The primary problem, therefore, is to minimize the tendency for the incident wave energy to be absorbed by interacting with the lower energy molecules and raising their energy level. This can be done by physically removing the molecules in the lower energy state so as to produce a preponderence of molecules in the upper energy state. This is achieved rather simply by the use of the Stark effect which takes advantage of the fact that the electric dipole moment of the gas molecule causes the molecule to change its rotational energy as it is brought into a static electric field. The potential energy of the molecule in the presence of a static electric field is given by $$V_{J,M} = BhJ(J+1) - \frac{\mu E^2}{2hB} \cdot \frac{3M^2 - J(J+1)}{J(J+1)(2J-1)(2J+3)} \quad (3)$$

where
M is a quantum number which described the component of the angular moment in the direction of the static electric field E.

The magnitude of the angular moment is given by $$|L| = \frac{h}{2\pi}\sqrt{J(J+1)} \quad (4)$$

and has components parallel to and normal to the electric field. Its component in the direction of the electric field is given by $$L_E = \frac{h}{2\pi}M \quad (5)$$

Since both the components L and $L_E$ are quantized, the molecule is not allowed to assume any arbitrary orientation with respect to the electric field but only those orientations for which the component of L in the direction of the electric field obeys Equation 5.

For any given energy state J, the quantum number M can assume the values $$M = -J, -J+1, \ldots 0, \ldots, J-1, J. \quad (6)$$

Of particular interest is the state $J=1$ for which M is limited to $-1, 0, +1$, and the $J=0$ state for which $M=0$.

Figure 3:
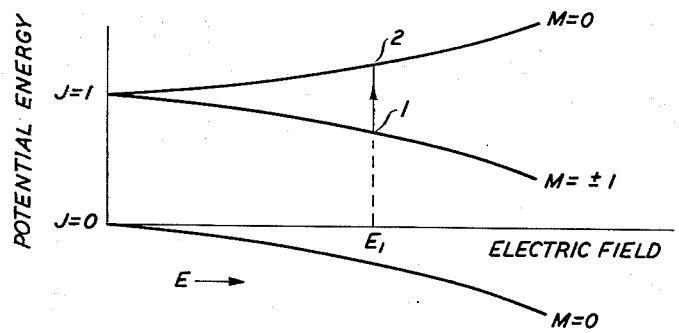
FIG. 3 is an energy diagram showing the variation of potential energy of the various types of molecules under the influence of an electrical field.

FIG. 3 shows the variation of the potential energy of a gas molecule in the two rotational energy states $J=1$ and $J=0$ as a function of the electric field strength. It is noted that for the $J=0$, $M=0$ and the $J=1$, $M=\pm 1$ states the potential energy of the molecules decreases with increasing field strength. For the $J=1$, $M=1$ state, however, the potential energy increases with increasing field strength. Thus, the potential energy of a molecule in the $J=1$ state depends upon the orientation of the angular moment vector of the molecule with respect to the direction of the electric field.

Forces act upon a body whose potential energy changes in space in such a way as to push the body in the direction of decreasing potential energy. Thus, if we allow the electric field in which the molecules are placed to be inhomogeneous, it will move the molecules in the $J=0$ and $J=1$, $M=\pm 1$ states in the direction of increasing field strength whereas the molecules in the $J=1$, $M=0$ state will be moved in the direction of decreasing electric field strength.

This behavior suggests a way to physically separate molecules in accordance with their energy state. However, this method is not entirely satisfactory since many of the $J=1$ state molecules tend to move in the same direction as the $J=0$ molecules. In fact, roughly two-thirds of the molecules in the preferred $J=1$ state will be lost in the absence of special precautions. This can be illustrated by referring to the focuser structure of FIG. 2. In operation, a gas beam, indicated by arrow 40, is applied at one end of the focuser in a direction essentially parallel to the focuser rods. The resulting electric field produced by the steady voltage source is very strong close to the rods, and in the region therebetween, but falls off to zero along the center of the focuser. Under the influence of the electric field the gas molecules are divided into two groups. One group, containing the molecules in the $J=1$, $M=0$ state, tends to move toward the center of the focuser (in the direction of decreasing field) and remains within the gas beam. The other group, containing molecules in the $J=0$ and $J=1$, $M=\pm 1$ states, is drawn towards the rods (in the direction of increasing field) and is removed from the gas beam. As a result the gas beam leaving the focuser contains only about one-third of the gas molecules in the preferred $J=1$ energy state. In accordance with the invention, however, the focuser efficiency is substantially improved by the superposition of a high frequency focusing field having electric field components normal to the electric field components of the electrostatic field. Specifically, the frequency of the high frequency field is adjusted so that at some region within the focuser structure molecules in the $J=1$, $M=\pm 1$ state experience a transition and jump to the $J=1$, $M=0$ state. This transition is indicated in FIG. 3 by the line extending from a point (1) on the $J=1$, $M=\pm 1$ curve to a point (2) on the $J=1$, $M=0$ curve. After the transition, the molecules tend to slow down and reverse their direction so as to travel back towards the weaker electric field and the center of the focuser structure. This change in the direction of the forces acting upon the molecules occurs because the molecules have jumped from the $M=\pm 1$ state to the $M=0$ state. The molecules by moving back towards the center of the focuser, are not lost as they would have been had the transition from point (1) on curve $M=\pm 1$ to point (2) on the $M=0$ curve not occurred. Upon reversing their direction, the molecules again enter into the transition region and again experience a transition but in the reverse sense, i.e., from point (2) to point (1), which will be accompanied by another change in their direction of motion if they have not yet left the focuser and entered into the signal cavity. However, even if they traverse the transition region several times as they progress longitudinally along the focuser, they will merely keep oscillating about the transition region but will not leave the gas beam.

In designing a focuser in accordance with the invention, the effect of the high frequency electric field upon the $J=1$, $M=0$ molecules must also be considered. In particular, the transition region has to be so located within the focuser structure that molecules in the $J=1$, $M=0$ state (that would normally stay within the beam) do not enter the region, jump to the $M=\pm 1$ state and get lost. Preferably, the transition region is located at points of high steady field intensity such that the initial radial momentum of the molecules in the $J=1$, $M=0$ state will have been overcome and the molecules will have been pushed back towards the center of the focuser before reaching this region and, thus, will remain within the gas beam.

The angular frequency $\Omega$ of the high frequency pumping field is related to the energy gap between points (1) and (2) on the energy curves of FIG. 3. However, because the molecules are in motion as they traverse the transition region, the simple expression of the type given by Equation 2 is modified by virtue of this motion. For the particular embodiment of FIG. 1, having four rods, the frequency of the pumping field is related to the distance $r_0$ of the transition region from the center of the focuser by $$\Omega = \frac{9}{40\pi}\left(\frac{r_0}{a^2}\right)^2 \frac{\mu^2 V_o^2}{h^2 B} \qquad (7)$$

where $V_0$ is the amplitude of the constant voltage applied to the rods, $\mu$ is the molecule dipole moment equal to $3.10^{-18}$ ergs per second for hydrogen cyanide, and $a$ is the distance from the center of the focuser to the rods.

Formula 7 is derived from the general equation $$\frac{\partial}{\partial r}(f[r] - F)r = 0$$

the solution of which defines $r_0$. $f$ is as given by Equation 2 and $\Omega = 2\pi F$.

The amplitude of the pumping field relates to the probability of an $M = \pm 1$ molecule jumping to the $M=0$ state. The greater the amplitude of the high frequency pumping field, the greater is the probability that a molecule traversing the transition region will change its energy state. For the four rod focuser of FIG. 2, this probability P is related to the intensity of the pumping field $E_{rf}$ (normal to the D.C. field) by $$P = \frac{r_0 \mu^2}{3.2 \times 10^2 h^2 B \gamma} E_{rf}^2 \qquad (8)$$

where $\gamma$ is the radial drift velocity of the molecule.

The following table gives different values of $\Omega$ necessary to induce a transition at a radius $r_0 = .8a$ from the focuser center for different constant voltages $V_0$ applied to the focuser rods. The value of $E_{rf}$ is calculated to make P, as given by Equation 8, equal to unity.

Table I

| $V_o$ (volts) | $F = \frac{\Omega}{2\pi}$ (Kmc.) | $E_{rf} \frac{V}{cm.}$ |
|---|---|---|
| 1,000 | 0.06 | 31.2 |
| 5,000 | 1.49 | 31.2 |
| 10,000 | 5.95 | 31.2 |
| 15,000 | 13.4 | 31.2 |
| 20,000 | 23.8 | 31.2 |

Figure 4:
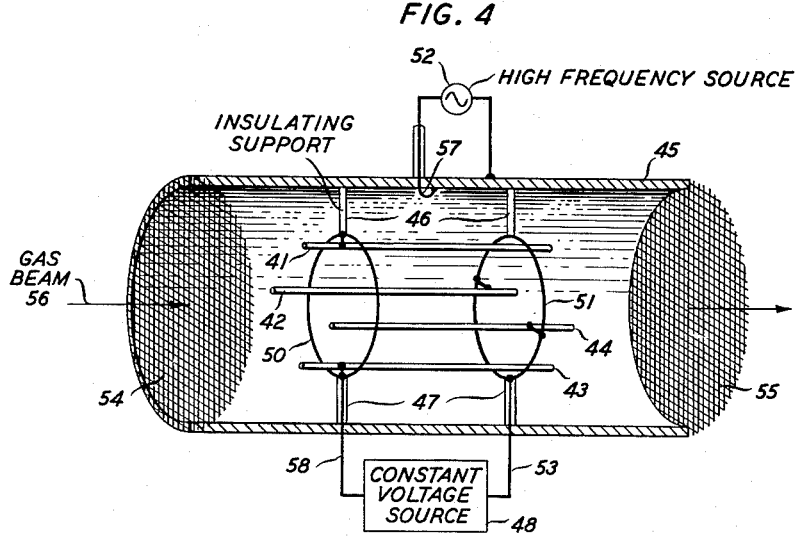
FIG. 4 shows a second embodiment of the invention showing the focuser located within a resonant cavity.

In a second embodiment of the invention, shown in FIG. 4, the focuser rod assembly, comprising rods 41 through 44 and their conductive supporting members 50 and 51, are located within a resonant cavity 45. The assembly is held in place by insulating posts 46 and 47 which connect to the support members at one end and rest upon the inside wall surface of cavity 45 at their other end. As in the embodiment of FIG. 1, each supporting member conductively contacts alternate rods and conductively connects to a terminal of a constant voltage source 48. In the embodiment of FIG. 4, wires 53 and 58 are passed through the insulating posts 47 and through the cavity wall to connect opposite terminals of source 48 to supporting members 50 and 51.

The ends of cavity 45 are closed by means of wire meshes 54 and 55 which permit the gas beam 56 to pass through the cavity but which reflect the electromagnetic wave energy. Cavity 45 is energized by means of a magnetic loop 57, or any other suitable means, from a source of high frequency wave energy 52. Source 52, and cavity 45, are tuned to the frequency necessary to retain the high energy molecules within the gas beam. As indicated in the previous discussion, this frequency is a function of the parameters of the focuser, the particular gas used and the specific energy levels of the gas molecules.

Since the steady electric field established in this type of focuser is transverse to the direction of gas flow, the cavity is energized in any convenient mode for which the electric field has components parallel to the direction of gas flow. Typical of such modes are the TM modes.

In order not to short circuit the high frequency electric field components in the vicinity of the focuser rods, the latter are advantageously made of low conductivity material, such as graphite-covered glass or any other suitable low conductivity material. While the particular value of the conductivity of the rods in the embodiments of FIGS. 1 and 4 is not critical, too high a conductivity will tend to short circuit the tangential components of high frequency electric field in the vicinity of the rods whereas too low a conductivity will make it difficult to establish and maintain the electrostatic focusing field.

Figure 5:
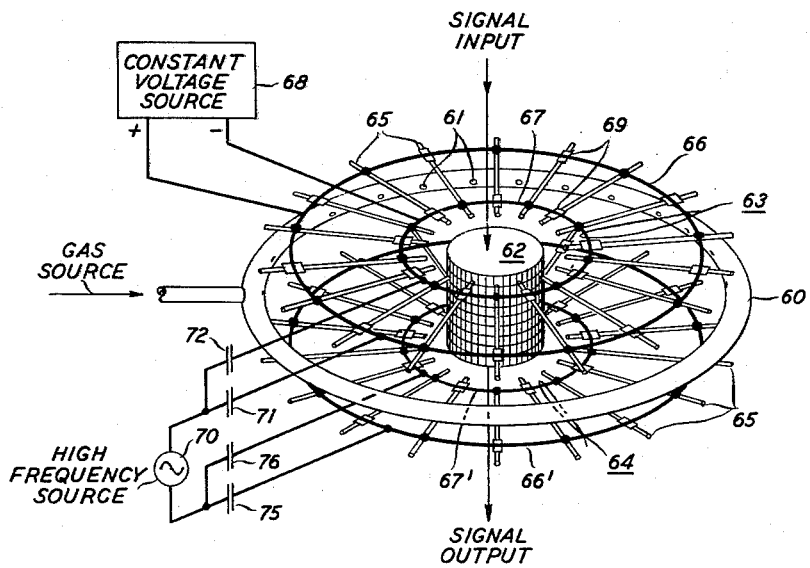
FIGS. 5 and 6 show focusers in accordance with the invention for use with a circular gas source.

To increase the intensity of the gas beam entering the signal cavity, a circular gas beam source is used to provide a plurality of radial gas beams and the signal cavity is located at the center of the circular source. Such an arrangement is shown in FIG. 5 and comprises a ring-shaped pipe 60 having a plurality of holes 61 along its inner surface through which the gas is ejected. Pipe 60 is furnished with gas from a gas supply (not shown). The gas beams are directed toward the center of the circle defined by pipe 60 wherein there is located a signal cavity 62. The sides of the signal cavity are either open or made of wire mesh to permit the gas to pass through the cavity.

Located between the circular gas pipe 60 and the signal cavity 62 are a pair of substantially identical focusing planes 63 and 64 for separating the higher energy gas molecules from the lower energy gas molecules. Each focusing plane consists of an array of radial rods 65 which are supported by a pair of conductive support rings 66 and 67. The rods and rings are typically made of a high conductivity material, such as copper, and in this respect differ from the focusers of FIGS. 1 and 4 wherein the rods are preferably made of a low conductivity material.

Ring 66 is connected to one terminal of a constant voltage source 68 and conductively connected to alternate rods in focusing plane 63. Ring 67 is connected to the other terminal of source 68 and conductively connected to the remaining rods in focusing plane 63. The rods are thus alternatively charged plus and minus creating an inhomogeneous electrostatic field about the focusing plane. The rods that are conductively connected to either of the rings 66 or 67 are connected by means of insulators 69 to the other of said rings for additional structural support.

A high frequency source 70 is connected between the focusing planes 63 and 64 by connecting each of the support rings 66 and 67 of focuser plane 63 to one terminal of the high frequency source 70 through blocking capacitors 71 and 72 and by connecting the support rings 66' and 67' of focusing plane 64 to the other terminal of the high frequency source 70 through blocking capacitors 75 and 76. So connected, the electrostatic focusing field is established between adjacent rods of each focusing plane and a high frequency focusing field is established between the focusing planes.

Figure 6:
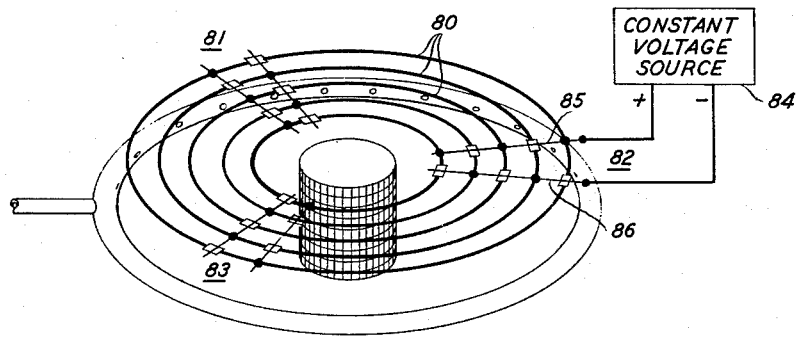

A second type of focusing plane is shown in FIG. 6 and comprises a plurality of concentric, circular conductive rings 80 and three pairs of supporting conductive rods 81, 82 and 83. One rod of each pair of said conducting rods is conductively connected to alternate rings. The other rod of each pair of supporting rods is conductively connected to the remaining rings. A constant voltage is established between adjacent rings by means of a constant voltage source 84 which connects to the two rods of one pair of supporting rods. In the embodiment of FIG. 6 the plus terminal is connected to rod 85 and the negative terminal to rod 86. Typically, two focusing planes are used and a high frequency source connected between the focusing planes as shown in FIG. 5.

Figure 7:
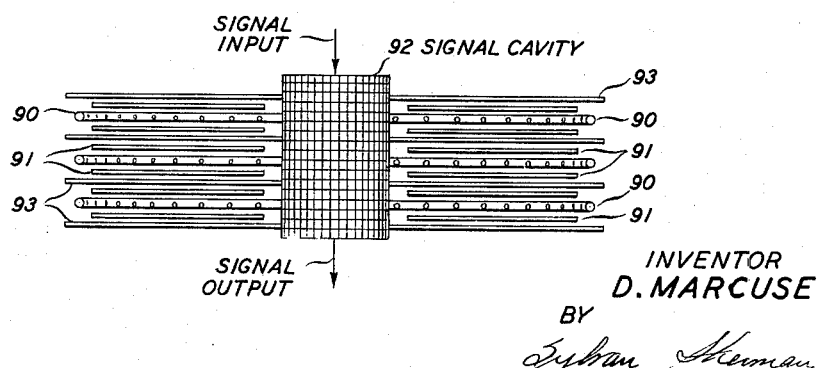
FIG. 7 shows an arrangement using a plurality of circular gas sources separated by cold traps.

The radial gas beam maser structures described above can be stacked to form many parallel planes of gas beams to further increase the volume of gas entering the signal cavity. This is illustrated in a cross-sectional view in FIG. 7 which shows the gas beam sources 90 disposed about a signal cavity 92. A pair of suitably biased focusing planes such as 91 are located between each of the gas sources 90 and the signal cavity 92. In order to remove the rejected gas molecules, a cold trap 93 is located between each gas source and associated focusing planes. The cold trap is typically a solid copper surface which is cooled to liquid nitrogen temperature by means of copper tubing which is soldered thereto and through which liquid nitrogen is circulated.

In all cases it is understood that the above-described arrangements are illustrative of a small number of the many possible specific embodiments which can represent applications of the principles of the invention. In general, the principles of the invention can be applied whenever the Stark effect is used to separate molecules of different energy levels. Thus, numerous and varied other arrangements can readily be devised in accordance with these principles by those skilled in the art without departing from the spirit and scope of the invention.

What is claimed is:

1. A focuser for use with a gas beam maser comprising means for establishing an inhomogeneous constant voltage electric field, means for establishing an alternating electric field having components perpendicular to said constant electric field, and means for projecting a gas beam along said focuser in a direction substantially perpendicular to said constant voltage electric field.

2. A gas beam maser comprising a source of gas, a focuser and a signal cavity, said focuser comprising a plurality of rods alternately charged plus and minus with respect to each other, means for establishing an alternating electric field in a direction substantially parallel to said rods, and means for projecting a gas beam along said focuser in a direction substantially parallel to said rods.

3. A gas beam focuser comprising a plurality of elongated rods equally spaced around the circumference of a circle and extending longitudinally parallel to each other, means for charging adjacent rods of said plurality of rods plus and minus with respect to each other, means for establishing an alternating electric field in a direction substantially parallel to said rods, and means for projecting a gas beam along said focuser in a direction substantially parallel to said rods.

4. A gas beam maser comprising a gas beam, a gas beam focuser and a signal cavity, said gas beam being directed to pass through said focuser to said cavity, said focuser comprising means for establishing an inhomogeneous electrostatic field in a direction perpendicular to the direction of said gas beam, and means for establishing an alternating electric field in a direction perpendicular to said electrostatic field.

5. A gas beam maser comprising a gas beam containing molecules in an upper energy state with rotational quantum number $J=1$ and in a lower energy state with rotational quantum number $J=0$, means for separating the gas molecules in the $J=1$ energy state from the gas molecules in the $J=0$ energy state comprising a plurality of elongated rods equally spaced around the circumference of a circle and extending longitudinally parallel to each other, means for applying a constant potential difference between adjacent rods in said circle of rods, means for applying an alternating potential difference between points along said rods, and means for passing said gas beam through said focuser in a direction parallel to said rods.

6. The combination according to claim 5 wherein said rods are made of low conductivity material.

7. A gas beam maser comprising a gas beam containing molecules in at least the $J=1$, $M=0$ energy state, the $J=1$, $M=\pm 1$ energy states and the $J=0$, $M=0$ energy state, means for separating the gas molecules in the $J=1$ energy states from the gas molecules in the $J=0$ energy state comprising a plurality of elongated rods equally spaced around the circumference of a circle and extending longitudinally parallel to each other, means for applying a constant potential between adjacent rods, and means for establishing an alternating electric field having electric field components parallel to said rods wherein the frequency of said electric field is proportioned to raise the energy level of said $J=1$, $M=\pm 1$ molecules to the energy level of said $J=1$, $M=0$ in a region within said circle of rods.

8. The combination according to claim 7 wherein said rods are located within a signal cavity tuned to said high frequency.

9. The combination according to claim 7 wherein there are four rods and wherein the angular frequency $\Omega$ of said alternating electric field is given by $$\Omega = \frac{9}{40\pi}\left(\frac{r_0}{a^2}\right)^2 \frac{\mu^2 V_0^2}{^2 B}$$

where $a$ is the distance from the center of the focuser to the rods, $\mu$ is the molecular dipole moment, $V_0$ is the amplitude of the constant voltage applied to the rods, $h$ is Planck's constant equal to $6.624 \cdot 10^{-27}$ erg seconds, $B$ is a constant of the gas, and $r_0$ is the distance from the center of the focuser to said region.

10. The combination according to claim 9 wherein the probability P that a molecule in the $J=1$, $M=\pm 1$ energy states will be raised to the $J=1$, $M=0$ energy state is related to the intensity of the alternating electric field $E_{rf}$ by $$P = \frac{r_0 \mu^2}{3.2 \times 10^2 h^2 B \gamma} E_{rf}^2$$

where $\gamma$ is the radial drift velocity of the molecule.

11. A gas beam maser comprising a plurality of gas sources distributed around the circumference of a circle to produce a plurality of radially directed gas beams, a signal cavity located at the center of said circle, a gas beam focuser disposed between said gas source and said cavity comprising a plurality of radially oriented conductive rods arranged to lie in a pair of parallel, spaced planes, means for applying a constant potential difference between adjacent rods in each of said planes, and means for establishing a high frequency potential difference between said planes.

12. A gas beam maser comprising a plurality of gas sources distributed around the circumference of a circle to produce a plurality of radially directed gas beams, a signal cavity located at the center of said circle, a gas beam focuser disposed between said gas source and said cavity comprising a plurality of concentric, circular conductive rings arranged to lie in a pair of parallel, spaced planes, means for applying a constant potential difference between adjacent rings in each of said planes, and means for establishing a high frequency potential difference between said planes.

13. A maser comprising a resonant structure, a source providing a flow of gas molecules for passage through said resonant structure and including excited molecules resonant at the resonant frequency of said structure, means intermediate said source and said resonant structure for sorting for passage through said resonant structure substantially only excited molecules resonant at the resonant frequency of the structure, said means comprising means for providing an inhomogeneous electrostatic field in the path of flow between said source and said resonant structure, and means for providing a radio frequency electric field normal to the electrostatic field.

References Cited in the file of this patent

UNITED STATES PATENTS

| | | |
|---|---|---|
| 2,762,871 | Dicke | Sept. 11, 1956 |
| 2,851,652 | Dicke | Sept. 9, 1958 |
| 2,995,711 | Peter et al. | Aug. 8, 1961 |